(12) United States Patent
Gofette

(10) Patent No.: US 7,485,192 B2
(45) Date of Patent: Feb. 3, 2009

(54) STEEL COIL CUTTING APPARATUS AND METHOD

(75) Inventor: Julien Gofette, Deyvillers (FR)

(73) Assignee: Edw. C. Levy Co., Detroit, MI (US)

( * ) Notice: Subject to any disclaimer, the term of this patent is extended or adjusted under 35 U.S.C. 154(b) by 447 days.

(21) Appl. No.: 11/187,299

(22) Filed: Jul. 22, 2005

(65) Prior Publication Data

US 2006/0021678 A1 Feb. 2, 2006

Related U.S. Application Data

(60) Provisional application No. 60/591,323, filed on Jul. 27, 2004.

(51) Int. Cl.
*B23K 7/00* (2006.01)
*B23K 7/10* (2006.01)

(52) U.S. Cl. .................... 148/205; 148/194; 266/54; 266/55; 266/77

(58) Field of Classification Search .................. 266/54, 266/55, 77; 148/194, 205
See application file for complete search history.

(56) References Cited

U.S. PATENT DOCUMENTS

| 2,510,835 | A | * | 6/1950 | Rice ............................ 409/259 |
| 3,700,222 | A | * | 10/1972 | Baxter et al. .................. 266/54 |
| 4,667,936 | A | * | 5/1987 | Hale, Jr. ....................... 266/55 |
| 4,725,715 | A | * | 2/1988 | Salinier et al. ............... 392/473 |
| 4,830,681 | A | * | 5/1989 | Arnout et al. ................ 148/205 |

* cited by examiner

*Primary Examiner*—Roy King
*Assistant Examiner*—Caitlin Fogarty
(74) *Attorney, Agent, or Firm*—Honigman Miller Schwartz & Cohn LLP

(57) ABSTRACT

A steel coil cutting apparatus that overcomes these and other problems has an automated arm having a free end. At least two cutting heads are attached to the free end of the automated arm.

26 Claims, 3 Drawing Sheets

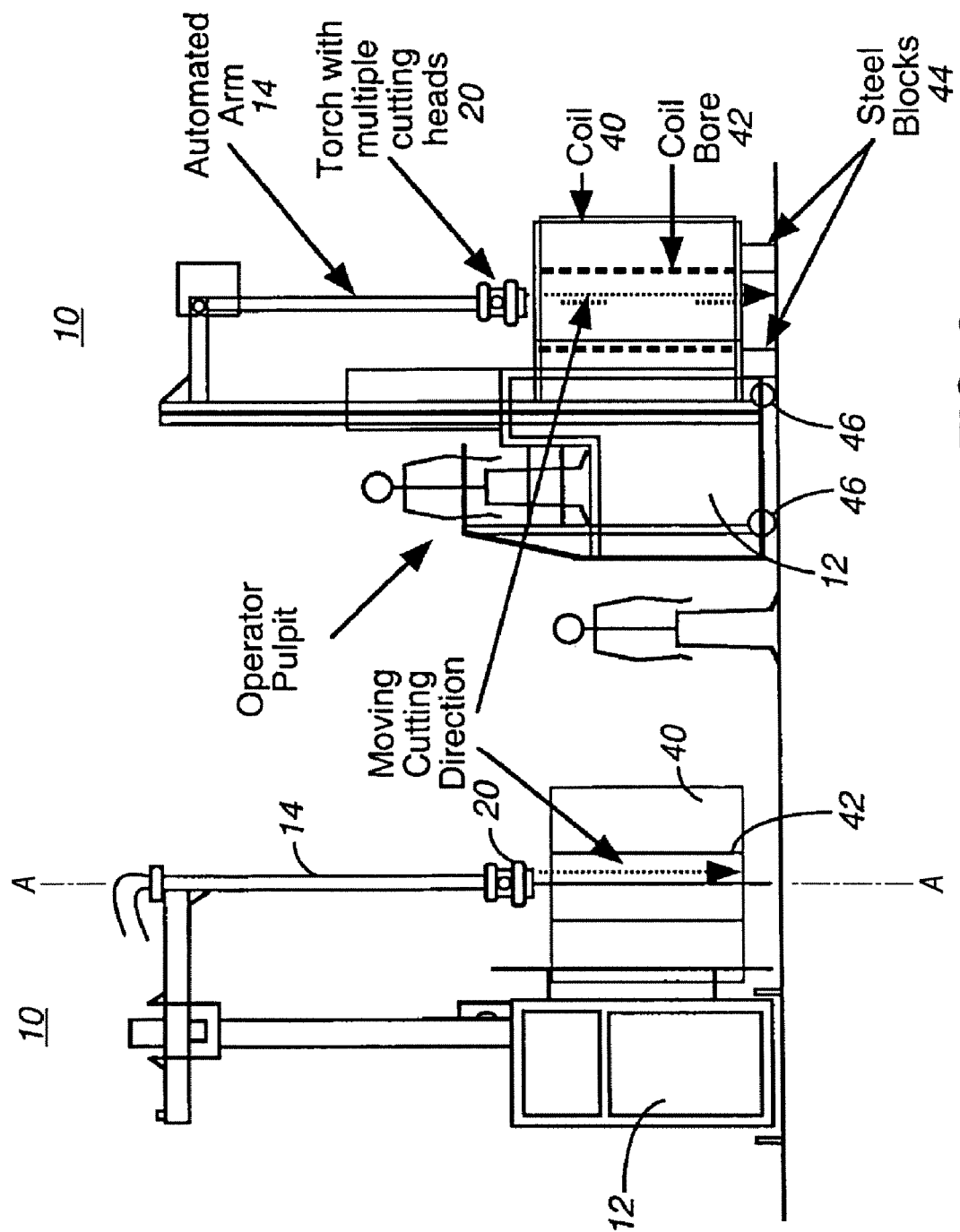

STEEL COIL CUTTING APPARATUS AND METHOD

RELATED APPLICATIONS

The present invention claims priority on provisional patent application, Ser. No. 60/591,323, filed on Jul. 27, 2004, entitled "Method and Apparatus for Steel Coil Cutting" and this provisional patent application is hereby incorporated by reference.

FIELD OF THE INVENTION

The present invention relates generally to the field of steel cutting devices and more particularly to a steel coil cutting apparatus and method.

BACKGROUND OF THE INVENTION

Steel coils that are defective are cut into smaller section of scrap to be fed and re-melted in a BOF (Blast Oxygen Furnace) or electric arc furnace. In most steel producing factories the process of cutting the defective steel coil is a manual process. A worker uses a single hand held torch to accomplish the task of cutting the coil into smaller parts by cutting the coil along it length from top to bottom along the exterior of the coil. As the coil is being cut, the coil opens up and additional cuts are required. This process can be time consuming and frustrating.

Thus there exists a need for a steel coil cutting apparatus that saves time, money and reduces the frustration of workers assigned this task.

SUMMARY OF INVENTION

A steel coil cutting apparatus that overcomes these and other problems has an automated arm having a free end. At least two cutting heads are attached to the free end of the automated arm. The cutting heads may be torches. A cooling system may cool the cutting heads. A housing holds the automated arm. A low melting point starter may be attached to one of the cutting heads. A regulator regulates a flow of gases to the torches. The arm may have a centering detection device.

In one embodiment, a method of cutting a steel coil includes the steps of aligning a number cutting heads to a center of the steel coil. The cutting heads are passed through the center of the steel coil. A speed at which the cutting head pass through the center of the steel coil may be regulated. A flow of gas to each of the cutting heads may be regulated. A flow of oxygen to each of the cutting heads may be regulated. The steel coil may be placed vertically on blocks. A low melting point starter may be placed near the cutting heads. The cutting heads may be cooled.

In one embodiment, a steel coil cutting apparatus has a platform. An arm has a first end attached to the platform. A number cutting torches are attached to a second end of the arm. The arm may be controlled by an electronic controller. A low melting point starter may be attached to the second end of the arm. A cooling system may cool the cutting torches. A centering detection device may be coupled to the second end of the arm. A flow regulator may regulating a flow of gas to one of the plurality of cutting torches.

BRIEF DESCRIPTION OF THE DRAWINGS

FIG. 2 is a side view of a steel coil cutting apparatus in accordance with one embodiment of the invention;

FIG. 3 is a side view of a steel coil cutting apparatus in accordance with one embodiment of the invention.

DETAILED DESCRIPTION OF THE DRAWINGS

The present invention is an apparatus and method for cutting steel coils that are defective. Once the steel coils are cut they can be fed into a steel furnace for reuse of the materials. The steel coil cutting apparatus uses a number of cutting heads or torches to make multiple cuts in the steel coil with a single pass of the cutting heads along an axis, A-A, extending through the center of the coil of steel.

Figure 1:
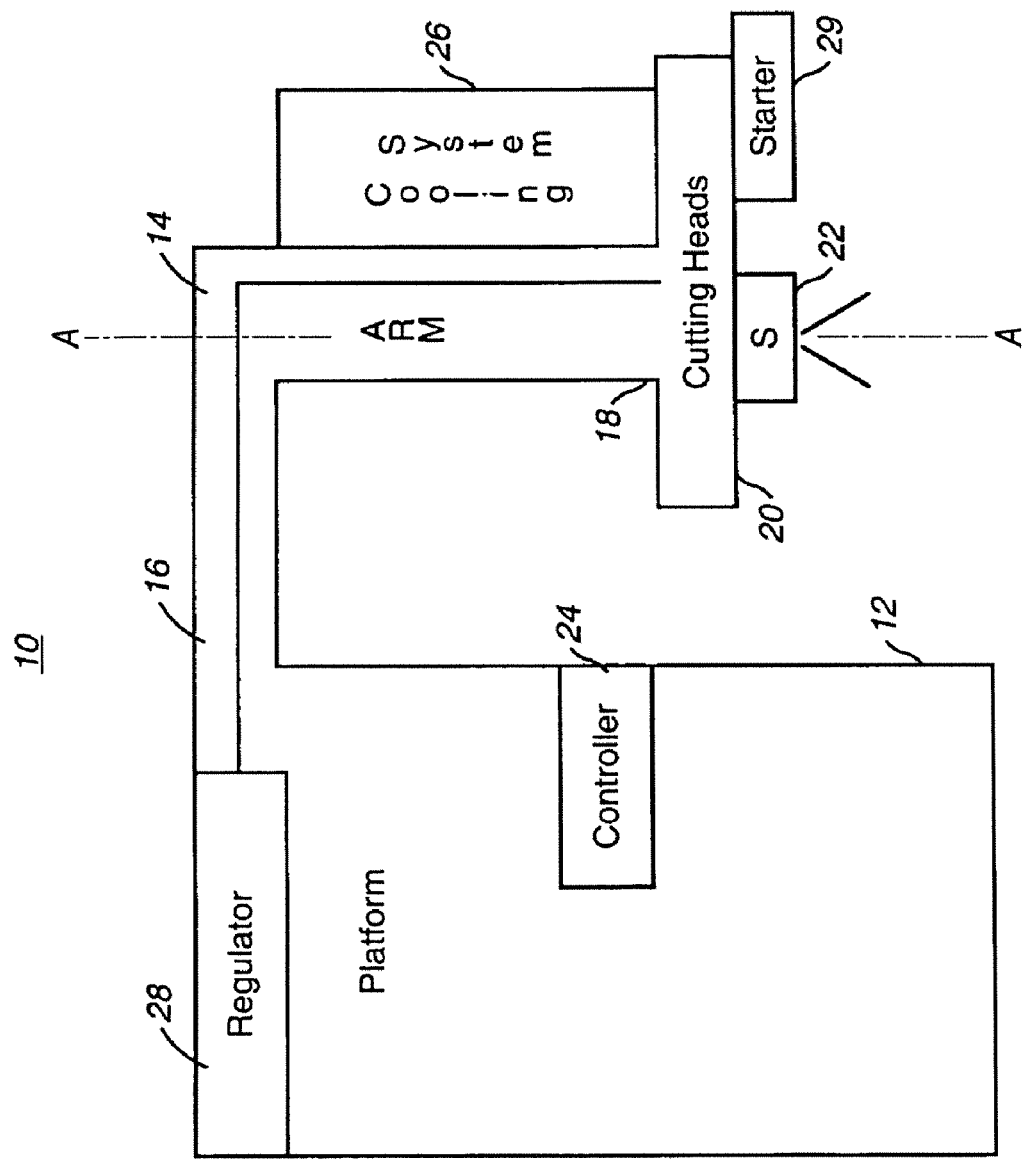
FIG. 1 is a block diagram of a steel coil cutting apparatus in accordance with one embodiment of the invention.

FIG. 1 is a block diagram of a steel coil cutting appartus 10 in accordance with one embodiment of the invention. The steel coil cutting apparatus 10 has a platform or housing 12. A controllable or automated arm 14 has a first end 16 coupled to the platform 12 and a second end 18 with a number of cutting heads 20. Usually there are two to four diametrically opposite cutting heads 20 which are commonly oxygen torches. Note the torch heads essentially point perpendicular to the length of the arm 14. The sensor 22 is part of the centering detection system that determines the center of the steel coil. The other part of the centering detection system is controller 24. The sensor 22 may be a laser and photo-detectors or it may be a camera system. A cooling system 26 is attached to the arm 14 and cools the arm 14 and the cutting torches 20 by circulating water over these parts in one embodiment. A regulator 28 regulates the supply of oxygen and gas to the cutting torches 20. A low melting point starter 29 is placed adjacent to the cutting edges. The starter 29 may use a low melting point wire rod feed or powder injection to enable a start of the fusion or high alloy steels.

FIG. 2 is a side view of a steel coil cutting apparatus 10 in accordance with one embodiment of the invention. This figure shows a cross section of the steel coil 40 that has a bore 42. The torch cutting heads 20 move vertically from the top of the steel coil to the bottom of the steel coil, in this embodiment. The invention may also be used to cut the steel coil 40 in a horizontal direction. FIG. 3 is a side view of a steel coil cutting apparatus 10 in accordance with one embodiment of the invention. This figure shows the steel coil 40 mounted a number of blocks 44. The blocks 44 allow the torch heads to cut all the way to the bottom of the steel coil 40. The platform has a place for an operator to stand and control the apparatus. In operation the apparatus 10 may be on wheels 46 and may be moved about the factory to cut defective steel coils in place. Once the apparatus 10 is next to the steel coil, the centering system is used to center the cutting torches along the axis, A-A extending within the bore 42 of the coil 40. The torches 20 are turned on and the automated arm 14 starts to move down into the bore 42. The automated arm 14 may be controlled by programmable logic controller 24 controls or similar controls so that the speed of entry and traverse of the arm 14 in the bore 42 can be precisely controlled. The arm control allows different speeds for the start, accelerated ramp speed and deceleration. The arm also controls the speed of the multiple torch heads 20 during cutting as different coil widths require different cutting speeds. The regulator 28 is used to adjust the flow of gases and oxygen to the cutting torch heads 20. The cooling system 26 cools the arm 14 and the cutting torches 20. Once the steel coil 40 has been cut, the apparatus 10 may be wheeled to the next steel coil to be cut.

Figure 4:
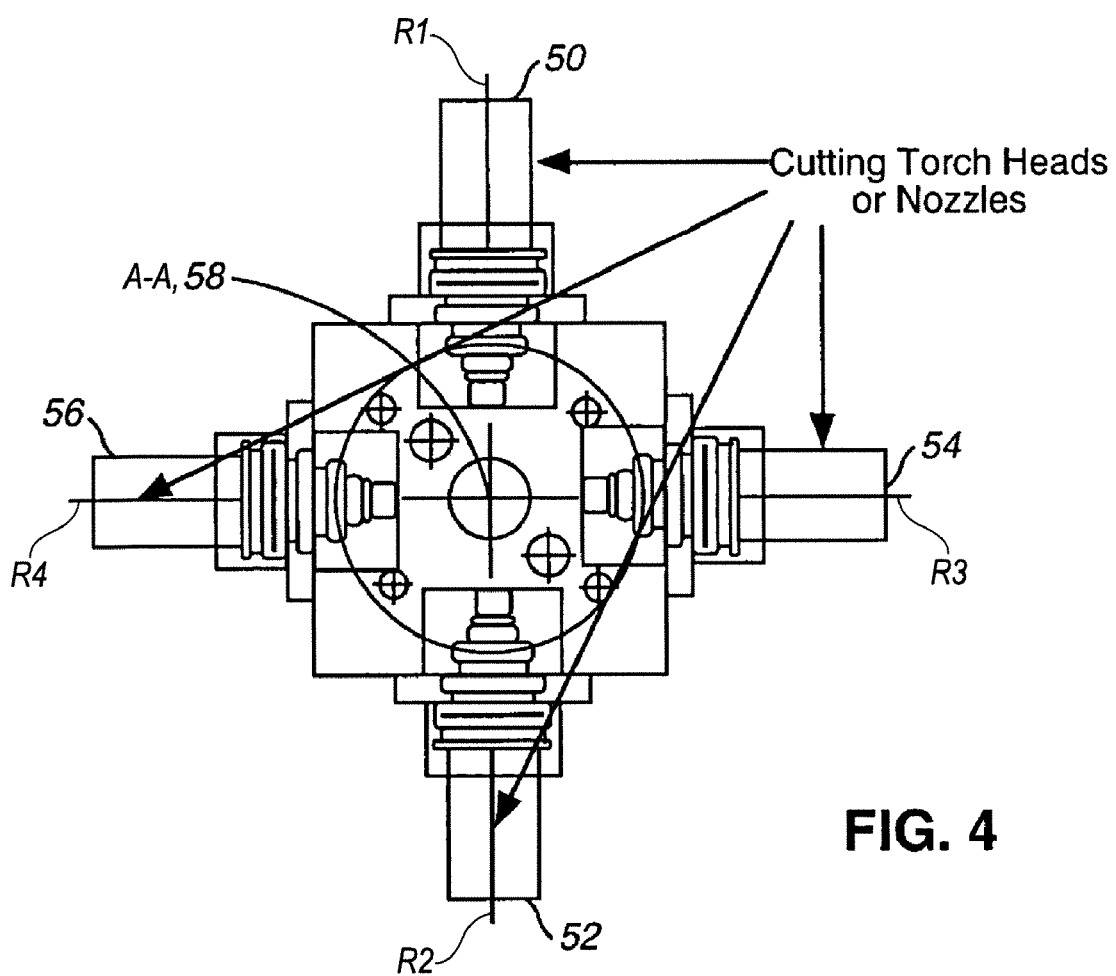
FIG. 4 is a top view of the cutting torch heads in accordance with one embodiment of the invention.

FIG. 4 is a top view of the cutting torch heads 20 in accordance with one embodiment of the invention. The individual torch heads 50, 52, 54, 56 extend radially in a radial cutting direction, R1, R2, R3, R4 from a point 58 co-axial with the axis, A-A. Note that the torch heads 50 and 52 are diametrically opposite of each other and torch heads 54 and 56 are diametrically opposite of each other.

Thus there has been described an apparatus and method for cutting steel coils that saves time, money and reduces the frustration of workers assigned this task.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of cutting a steel coil including an axial center located within a bore of the steel coil, comprising the steps of:
   positioning a cutting apparatus proximate the axial center of the steel coil;
   utilizing an imaging device as a sensor that is attached to the cutting apparatus for detecting the axial center of the steel coil;
   aligning the cutting apparatus to be co-axial with the axial center according to the detected axial center;
   providing the cutting apparatus with a cutting device;
   radially directing the at least one cutting device; and
   axially cutting an entire length of the steel coil by
      activating the at least one cutting device, and
      axially moving the at least one cutting device through
         the bore of the steel coil from
         a first end of the steel coil to
         a second end of the steel coil.

2. The method according to claim 1, further comprising the step of:
   utilizing a laser and photo-detector as the imaging device.

3. The method according to claim 1, further comprising the step of:
   utilizing a camera system as the imaging device.

4. The method according to claim 1, further comprising the step of:
   orientating a sensing direction of the imaging device in a substantially axial direction.

5. The method according to claim 1, wherein the cutting apparatus includes an arm having an end and further comprising the step of:
   attaching the imaging device to the end of the arm.

6. The method according to claim 1, wherein the cutting apparatus includes an arm and further comprising the step of:
   disposing the cutting device upon the arm;
   perpendicularly arranging the cutting device relative the arm; and
   attaching the imaging device to the cutting device.

7. The method according to claim 1, further comprising the steps of:
   vertically elevating the steel coil a distance from a support surface by
      providing a plurality of blocks between the support surface and the second end.

8. The method according to claim 1, wherein the at least one cutting device includes at least one pair of cutting devices, wherein the at least one pair of cutting devices includes a first cutting device and a second cutting device and further comprising the step of:
   diametrically opposing the first cutting device and the second cutting device.

9. A method of cutting a steel coil including a bore, an outer surface, a first axial end, a second axial end and an axial center located within the bore, wherein the bore defines an inner surface of the steel coil, wherein the steel coil defines an axial length extending between the first axial end and the second axial end, comprising the steps of:
   arranging a cutting apparatus within the bore of the steel coil;
   radially outwardly directing at least one cutting device attached to the cutting apparatus for
      pointing the at least one cutting device toward the inner surface of the steel coil; activating the at least one cutting device;
   radially cutting the steel coil from the inner surface to the outer surface; and
   axially cutting the axial length of the steel coil by
      axially moving the at least one cutting device that is radially-outwardly directed through the bore of the steel coil from
         the first axial end of the steel coil to
         the second axial end of the steel coil.

10. The method according to claim 9, wherein the arranging step further comprises the step of:
    utilizing an imaging device as a sensor that is attached to the cutting apparatus for
       detecting the axial center of the steel coil; and
    aligning the cutting apparatus to be co-axial with the axial center according to the detected axial center.

11. The method according to claim 10, further comprising the step of:
    utilizing a laser and photo-detector as the imaging device.

12. The method according to claim 10, further comprising the step of:
    utilizing a camera system as the imaging device.

13. The method according to claim 10, further comprising the step of:
    orientating a sensing direction of the imaging device in a substantially axial direction.

14. The method according to claim 10, wherein the cutting apparatus includes an arm having an end and further comprising the step of:
    attaching the imaging device to the end of the arm.

15. The method according to claim 10, wherein the cutting apparatus includes an arm and further comprising the step of:
    disposing the cutting device upon the arm; and
    attaching the imaging device to the cutting device.

16. The method according to claim 9, further comprising the steps of:
    vertically elevating the steel coil a distance from a support surface by
       providing a plurality of blocks between the support surface and the second end.

17. The method according to claim 9, wherein the at least one cutting device includes at least one pair of cutting devices, wherein the at least one pair of cutting devices includes a first cutting device and a second cutting device and further comprising the step of:
    diametrically opposing the first cutting device and the second cutting device.

18. A method of cutting a steel coil including a bore, an outer surface, a first axial end, a second axial end and an axial center located within the bore, wherein the bore defines an inner surface of the steel coil, wherein the steel coil defines an axial length extending between the first axial end and the second axial end, comprising the steps of:

utilizing an imaging device as a sensor that is attached to a cutting apparatus for detecting the axial center of the steel coil;

aligning the cutting apparatus to be co-axial with the axial center according to the detected axial center;

arranging the cutting apparatus within the bore of the steel coil;

activating a cutting device of the cutting apparatus for radially cutting the steel coil from the inner surface to the outer surface; and axially moving the cutting device through the bore of the steel coil from
the first axial end of the steel coil to
the second axial end of the steel coil for axially cutting the axial length of steel coil.

19. The method according to claim 18, wherein the arranging step further comprises:

radially outwardly directing at least one cutting device attached to the cutting apparatus for
pointing the at least one cutting device toward the inner surface of the steel coil.

20. The method according to claim 18, further comprising the step of:

utilizing a laser and photo-detector as the imaging device.

21. The method according to claim 18, further comprising the step of:

utilizing a camera system as the imaging device.

22. The method according to claim 18, further comprising the step of:

orientating a sensing direction of the imaging device in a substantially axial direction.

23. The method according to claim 18, wherein the cutting apparatus includes an arm having an end and further comprising the step of:

attaching the imaging device to the end of the arm.

24. The method according to claim 18, wherein the cutting apparatus includes an arm and further comprising the step of disposing the cutting device upon the arm; and attaching the imaging device to the cutting device.

25. The method according to claim 18, further comprising the steps of vertically elevating the steel coil a distance from a support surface by
providing a plurality of blocks between the support surface and the second end.

26. The method according to claim 18, wherein the at least one cutting device includes at least one pair of cutting devices, wherein the at least one pair of cutting devices includes a first cutting device and a second cutting device and further comprising the step of diametrically opposing the first cutting device and the second cutting device.

* * * * *